United States Patent
Fudo et al.

(10) Patent No.: US 11,293,082 B2
(45) Date of Patent: Apr. 5, 2022

(54) POWDER CONTAINING TUNGSTEN CARBIDE

(71) Applicant: A.L.M.T. Corp., Tokyo (JP)

(72) Inventors: Takayuki Fudo, Toyama (JP); Kazuo Sasaya, Toyama (JP); Takehiko Hayashi, Toyama (JP)

(73) Assignee: A.L.M.T. Corp., Tokyo (JP)

(*) Notice: Subject to any disclaimer, the term of this patent is extended or adjusted under 35 U.S.C. 154(b) by 28 days.

(21) Appl. No.: 16/762,903

(22) PCT Filed: Nov. 13, 2018

(86) PCT No.: PCT/JP2018/041953
§ 371 (c)(1),
(2) Date: May 8, 2020

(87) PCT Pub. No.: WO2019/098183
PCT Pub. Date: May 23, 2019

(65) Prior Publication Data
US 2020/0392606 A1    Dec. 17, 2020

(30) Foreign Application Priority Data
Nov. 14, 2017 (JP) .............................. JP2017-219191

(51) Int. Cl.
*C22C 29/08* (2006.01)
*C01B 32/949* (2017.01)
(Continued)

(52) U.S. Cl.
CPC ............ *C22C 29/08* (2013.01); *B22F 1/0011* (2013.01); *C01B 32/949* (2017.08); *C22C 1/051* (2013.01);
(Continued)

(58) Field of Classification Search
None
See application file for complete search history.

(56) References Cited

U.S. PATENT DOCUMENTS 5,928,976 A * 7/1999 Yamamoto ............ C01B 32/949
501/87
2004/0079191 A1   4/2004 Kobayashi

FOREIGN PATENT DOCUMENTS

CN          1850595 A    10/2006
CN        102517467 A    6/2012
(Continued)

OTHER PUBLICATIONS

Zhong et al., "A study on the synthesis of nanostructured WC-10 wt% Co particles from WO3, CO3O4, and graphite," Journal of Material Science, Oct. 30, 2010, vol. 46, pp. 6323-6331 [Cited in ISR].

(Continued)

*Primary Examiner* — Ronak C Patel
(74) *Attorney, Agent, or Firm* — Baker Botts L.L.P.; Michael A. Sartori

(57) ABSTRACT

A powder containing tungsten carbide has an Fsss particle size of greater than or equal to 0.3 μm and less than or equal to 1.5 μm, and a content rate of the tungsten carbide of greater than or equal to 90% by mass. The powder has a crystallite size (average particle diameter) Y satisfying a relational expression of Y≤0.1×X+0.20 (X: the Fsss particle size of the power containing tungsten carbide).

2 Claims, 8 Drawing Sheets

APPEARANCE PHOTOGRAPH OF POWDER CONTAINING TUNGSTEN CARBIDE (SAMPLE NO. 8) OF EXAMPLE

(51) Int. Cl.
*C22C 1/05* (2006.01)
*B22F 1/00* (2006.01)

(52) U.S. Cl.
CPC ....... *B22F 2302/10* (2013.01); *C01P 2002/60* (2013.01); *C01P 2004/03* (2013.01); *C01P 2004/61* (2013.01); *C01P 2004/62* (2013.01); *C01P 2006/80* (2013.01)

(56) References Cited

FOREIGN PATENT DOCUMENTS

| CN | 106077668 A | 11/2016 |
| EP | 0808912 A1 | 11/1997 |
| JP | S48-034800 A | 5/1973 |
| JP | H03-208811 A | 9/1991 |
| JP | H09-309715 A | 12/1997 |
| JP | H11-021119 A | 1/1999 |
| JP | 2004-142993 A | 5/2004 |
| JP | 2005-519018 A | 6/2005 |
| JP | 2005-335997 A | 12/2005 |
| JP | 2006-205354 A | 8/2006 |
| JP | 2009-242181 A | 10/2009 |
| WO | 03/074744 A2 | 9/2003 |
| WO | 2018/050474 A1 | 3/2018 |

OTHER PUBLICATIONS

Madhav Reddy et al., "Nanostructured tungsten carbides by thermochemical processing," Journal of Alloys and Compounds, Jan. 22, 2010, vol. 494, pp. 404-409 [Cited in ISR].

Database WPI Week 201318 Thomson Scientific, London, GB; AN2012-J83247 Jun. 27, 2012. [Cited in NPL2].

European Search Report issued in counterpart European Patent Application No. 18879803.7 dated Jul. 16, 2021.

\* cited by examiner

APPEARANCE PHOTOGRAPH OF POWDER CONTAINING TUNGSTEN CARBIDE (SAMPLE NO. 8) OF EXAMPLE

APPEARANCE PHOTOGRAPH OF POWDER CONTAINING TUNGSTEN
CARBIDE (SAMPLE NO. 27) (OBTAINED BY CONVENTIONAL
PRODUCTION METHOD 1) OF COMPARATIVE EXAMPLE

CRYSTALLITE MAPPING IMAGE (EBSD MAPPING IMAGE) OF POWDER
CONTAINING TUNGSTEN CARBIDE (SAMPLE NO. 8) OF EXAMPLE

CRYSTALLITE MAPPING IMAGE (EBSD MAPPING IMAGE) OF POWDER CONTAINING TUNGSTEN CARBIDE (SAMPLE NO. 27) (OBTAINED BY CONVENTIONAL PRODUCTION METHOD 1) OF COMPARATIVE EXAMPLE

PHOTOGRAPH OF METALLOGRAPHIC STRUCTURE OF CEMENTED CARBIDE ALLOY OF EXAMPLE

PHOTOGRAPH OF METALLOGRAPHIC STRUCTURE OF CEMENTED CARBIDE ALLOY (OBTAINED BY CONVENTIONAL PRODUCTION METHOD 1) OF COMPARATIVE EXAMPLE

POWDER CONTAINING TUNGSTEN CARBIDE

TECHNICAL FIELD

The present invention relates to a powder containing tungsten carbide. The present application claims priority based on Japanese Patent Application No. 2017-219191 filed on Nov. 14, 2017. All descriptions described in the Japanese patent application are incorporated herein by reference.

BACKGROUND ART

Conventionally, a powder containing tungsten carbide is disclosed in, for example, Japanese Patent Laying-Open No. 9-309715 (PTL 1), Japanese Patent Laying-Open No. 11-21119 (PTL 2), Japanese Patent Laying-Open No. 3-208811 (PTL 3), and Japanese Patent Laying-Open No. 2005-335997 (PTL 4).

CITATION LIST

Patent Literature

PTL 1: Japanese Patent Laying-Open No. 9-309715
PTL 2: Japanese Patent Laying-Open No. 11-21119
PTL 3: Japanese Patent Laying-Open No. 3-208811
PTL 4: Japanese Patent Laying-Open No. 2005-335997

SUMMARY OF INVENTION

A powder containing tungsten carbide according to an aspect of the present invention, wherein: the powder has an Fsss particle size of greater than or equal to 0.3 μm and less than or equal to 1.5 μm, and a content rate of the tungsten carbide of greater than or equal to 90% by mass; and the powder has a crystallite size (average particle diameter) Y satisfying a relational expression of $Y \leq 0.1 \times X + 0.20$ (X: the Fsss particle size of the power containing tungsten carbide).

DETAILED DESCRIPTION

Figure 1:
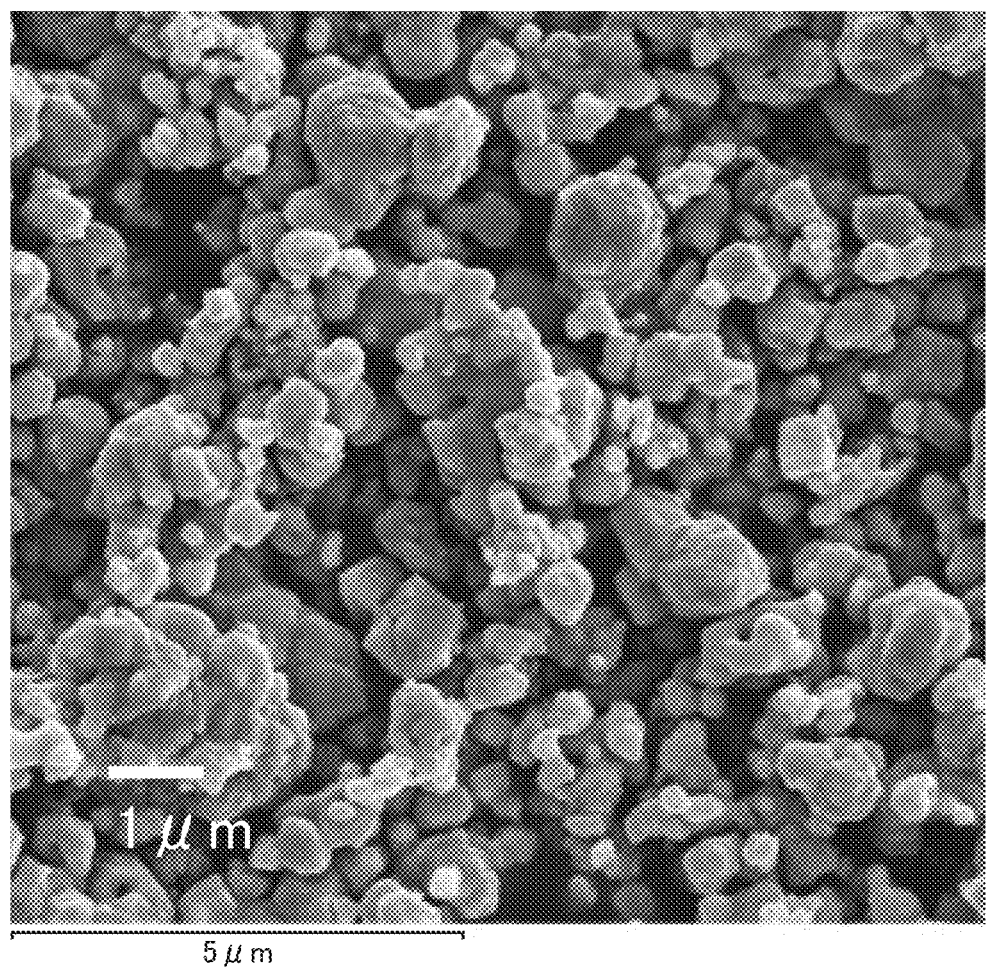
FIG. 1 is a SEM photograph showing an appearance of a powder containing tungsten carbide of Sample No. 8 of Example.

Problem to be Solved by the Present Disclosure

However, the conventional technique could not provide a powder containing tungsten carbide which is easy to handle and can produce an ultrafine cemented carbide alloy.

The present invention has been made in order to solve the problems, and an object of the present invention is to provide a powder containing tungsten carbide which is easy to handle and can produce an ultrafine cemented carbide alloy.

Advantageous Effect of the Present Disclosure

According to the above, it is possible to provide a powder containing tungsten carbide which is easy to handle and can produce an ultrafine cemented carbide alloy.

Description of Embodiments

First, aspects of the present invention will be listed and described.

1. Overall Configuration

A powder containing tungsten carbide according to an aspect of the present invention, wherein: the powder has an Fsss particle size of greater than or equal to 0.3 μm and less than or equal to 1.5 μm, and a crystallite size (average particle diameter) Y satisfying a relational expression of $Y \leq 0.1 \times X + 0.20$ (X: the Fsss particle size of the power containing tungsten carbide).

The crystallite refers to the largest gathering which can be regarded as a single crystal, and a powder containing tungsten carbide is composed of a plurality of crystallites.

The present inventors have conducted intensive studies in order to provide a powder containing tungsten carbide which is easy to handle and can produce an ultrafine cemented carbide alloy, and as a result, have paid attention to the size of the crystallite of the powder containing tungsten carbide.

In production of a cemented carbide alloy using a powder containing tungsten carbide, in general, fine particles cause a decreased bulk density of a powder, which causes difficulties in press molding, and, an increased amount of oxygen, which causes difficult sintering. That is, it is desirable that the particle diameter of the powder containing tungsten carbide be moderately coarse and an ultrafine alloy can be produced. The present inventors have found that, by reducing the sizes of the crystallites constituting the powder containing tungsten carbide, the particle size of the tungsten carbide of the cemented carbide alloy produced using the powder containing tungsten carbide can be reduced. As a result, a powder containing tungsten carbide having a larger particle diameter but smaller crystallites than those of a conventional ultrafine tungsten carbide powder can produce an ultrafine cemented carbide alloy comparable with the conventional ultrafine tungsten carbide powder.

The amount of oxygen adsorbed on a surface of the powder containing tungsten carbide increases as the particle diameter of the powder decreases. If the amount of oxygen increases, the amount of gas generated in a sintering process when a cemented carbide alloy is produced increases, which causes a problem that holes are apt to be generated in the alloy. In addition, the amount of oxygen increases, and therefore, a fluctuation range of a carbon amount of the cemented carbide alloy also increases, and therefore, this makes it difficult to obtain a proper structure, which causes a problem that mechanical properties are not improved. A powder containing tungsten carbide having a large particle diameter is less likely to cause such a problem.

Preferably, the powder containing tungsten carbide contains chromium in an amount of greater than or equal to 0.2% by mass and less than or equal to 2.5% by mass. Chromium is an element used as a grain growth inhibitor for the cemented carbide alloy.

Preferably, the powder containing tungsten carbide contains oxygen in an amount of less than or equal to 0.3% by mass.

Preferably, in the powder containing tungsten carbide, the abundance ratio of crystallites having a crystallite size within a range of Y±0.5Y exceeds 85%. If the abundance ratio of crystallites having a crystallite size within a range of Y±0.5Y exceeds 85%, tungsten carbide particles are uniformed, and therefore, this makes it possible to suppress the occurrence of abnormal grain growth when tungsten carbide is sintered to form a cemented carbide alloy, which makes it possible to uniform the particles in the cemented carbide alloy to increase a coercive force Hc. More preferably, in the powder containing tungsten carbide, the abundance ratio of crystallites having a crystallite size within a range of Y±0.5Y exceeds 90%.

2. Comparison with Conventional Technique

PTL 1 discloses a conventional production method 1 as a method for producing a tungsten carbide powder. The conventional production method 1 is a method for producing a tungsten carbide powder using a tungsten powder. A diffusion layer of Cr, Ta, Mo, Nb, Zr, or V or the like is formed, to form a composite carbide composed of fine primary tungsten carbide crystals (in powder).

PTL 2 discloses a conventional production method 1 as a method for producing tungsten carbide. A tungsten carbide-based composite carbide is disclosed, which is composed of fine primary tungsten carbide crystals (in powder) obtained by blending C, Cr or chromium oxide, and a chromium compound in a tungsten powder and containing chromium within a range of 0.2 to 2.5% by mass. In the composite carbide, when an average particle diameter due to Fischer (Fsss) method is greater than or equal to 1 μm; the half-value width of a 211 plane of a tungsten carbide crystal due to X-ray diffraction (JCPDS card 25-1047, d: 0.9020) is taken as Y; and a particle diameter due to the Fsss method is taken as X, a relational expression of Y>0.61−0.33 log(X) is satisfied, and a shrinkage ratio when a cemented carbide alloy is produced is greater than or equal to 16.7% and less than 20%.

PTL 3 discloses a conventional production method 2. The conventional production method 2 is a method for producing a tungsten carbide powder by reducing a tungsten oxide powder with a carbon powder. There is disclosed a method for producing an ultrafine tungsten carbide powder having a uniform particle diameter (powder) of less than or equal to 0.5 μm by mixing a $WO_3$ powder with a carbon powder and heating the mixture in an $N_2$ atmosphere and an $H_2$ atmosphere.

PTL 4 discloses a conventional production method 2. A step of crushing an intermediate product during a carbonization step is added to obtain a tungsten carbide powder having a nanoparticle diameter having an average particle diameter (powder) of less than or equal to 100 nm.

In the industry where a cemented carbide alloy is used for a cutting tool, as a technical trend, an alloy having excellent mechanical properties is obtained by reducing the particle diameters of tungsten carbide particles when producing a fine cemented carbide alloy. The particle diameter of the tungsten carbide in the cemented carbide alloy has a correlation with the sizes of crystallites constituting tungsten carbide particles of a tungsten carbide powder as a raw material.

Meanwhile, as a method for producing a tungsten carbide powder used as a raw material for a cemented carbide alloy, two types of the conventional production method 1 and the conventional production method 2 are mainly known, but each of the methods has the following problems.

In the conventional production method 1 of PTLs 1 and 2, W oxide is heated in a reducing atmosphere furnace to be reduced to W, and the obtained tungsten and carbon are mixed, followed by heating the mixture in a heat treatment furnace again to be carbonized into tungsten carbide, thereby obtaining a tungsten carbide powder. The particle diameter of the tungsten carbide powder thus obtained is within a moderately coarse particle size range which is easy to handle in order to produce a cemented carbide alloy, but the sizes of the crystallites in the method are greater than those in other production methods. A cemented carbide alloy produced using a tungsten carbide powder having large crystallites has a problem that a tungsten carbide particle diameter increases. That is, the conventional production method 1 makes it difficult to provide a fine WC powder, and to provide a coarse WC powder having a small crystallite size.

In the conventional production method 2 of PTLs 3 and 4, a mixture of tungsten oxide and carbon is heated in a heat treatment furnace to obtain a tungsten carbide powder. The tungsten carbide powder thus obtained has a small crystallite size. The cemented carbide alloy produced using the tungsten carbide powder can decrease the tungsten carbide particle diameter. However, the tungsten carbide powder has a small particle diameter and a large specific surface area, so that the amount of adsorbed oxygen increases, which makes it difficult to obtain a proper phase of a cemented carbide alloy. The bulk density of the powder is low, which causes a problem such as difficult press molding.

3. Powder Containing Tungsten Carbide According to One Aspect of the Present Invention The powder containing tungsten carbide according to one aspect of the present invention is a polycrystal having fine crystallites. The crystallite size of each crystal is very small, and the powder containing tungsten carbide has a moderately coarse Fsss particle size. That is, when the cemented carbide alloy is prepared using the powder containing tungsten carbide according to one aspect of the present invention, an ultrafine alloy structure is obtained, and an effect of easy handling (handleability) in a powder state containing tungsten carbide is also provided. The powder containing tungsten carbide contains tungsten carbide in an amount of greater than or equal to 90% by mass. The powder containing tungsten carbide may contain cobalt and chromium and the like in addition to the tungsten carbide. More preferably, the powder containing tungsten carbide contains tungsten carbide in an amount of greater than or equal to 95% by mass.

3-1: Crystallite Size of Tungsten Carbide (Unit: μm)

If X is an Fsss particle size of the tungsten carbide and Y is a crystallite size (average particle diameter), the following relational expression is realized between them.

$$Y \leq 0.1 \times X + 0.2$$

The Fsss particle size can be measured using Fisher Sub-Sieve Sizer Model 95 manufactured by Fisher Scientific.

It has been found that, by setting the crystallite size within this range, the particle diameter of the tungsten carbide in the cemented carbide alloy can be reduced when the cemented carbide alloy is produced from the powder containing tungsten carbide. The crystallite size Y preferably satisfies $0.05 \, \mu m \leq Y \leq 0.3 \, \mu m$.

From the viewpoint of industrial production, it is preferable that $Y \geq 0.1 \times X + 0.1$ is set. This means that it is difficult to produce a powder containing tungsten carbide having a small crystallite size at low cost.

The crystallite size (average particle diameter) is measured by the EBSD method or the Rietveld method (X-ray diffraction).

EBSD means electron backscatter diffraction. This is also called Electron backscattering pattern (EBSP). The EBSD is combined with a scanning electron microscope (SEM), and a pseudo-Kikuchi pattern is analyzed while electron beams are manipulated, to measure microscopic crystal orientation and crystal system. Information about each crystal grain can be obtained, differing from X-ray diffraction by which average information is obtained. It is also possible to analyze crystal grain orientation distribution (texture) and crystal phase distribution from the crystal orientation data. The pseudo-Kikuchi pattern is a band-like pattern which occurs when reflected electrons are diffracted by an atomic plane in a sample when electron beams are applied to the sample. The symmetry of a band corresponds to the crystal system, and a band spacing corresponds to an atomic plane spacing.

In the present invention, the crystallite size (average particle diameter), the measurement range of the crystallite size (Y±0.5Y), and the abundance ratio of the crystallite having the crystallite size within a range of (Y±0.5Y) are measured by the EBSD method. Specifically, measurement is performed using the following model.

TABLE 1

| | |
|---|---|
| Model name | FE-SEM JEOL JSM7800F |
| Detector | EBSD detector digview5 manufactured by AMETEK |
| Software name | OIM ver. 7.3 |
| Measurement conditions | Acceleration voltage: 15 kV<br>WD: 15 mm<br>Sample tilt: 70 degrees<br>Magnification: x15,0000<br>scan step: 0.05 μm |
| Data processing conditions | 1. Clean up processing<br>Conduct grain dilation and grain CI standardization<br>2. Definition of grain boundary<br>gran Tolerance Angle: 5 deg.<br>minimum grain size: 2 pixel<br>3. Histogram<br>Vertical axis: Abundance ratio of crystal grain size of tungsten carbide (frequence)<br>Horizontal axis: 0.1 μm interval (class) within crystallite size range of 0 to 1.5 μm |

The Rietveld method can be used as another method for measuring the crystallite size. The Rietveld method fits diffraction patterns obtained from a powder X-ray diffraction experiment or a powder neutron diffraction experiment with diffraction patterns calculated from parameters related to a crystal structure and a peak shape and the like using the least-square method, thereby refining the parameters related to a crystal structure and a peak shape and the like. In the Rietveld method, an X-ray diffractometer (model name: Panalytical Enpyrean, software name: High Score Plus) is used. In the present invention, numerical values obtained by the EBSD method are shown, but fine crystallites were also similarly confirmed by the Rietveld method. The crystallite size of greater than or equal to 0.5 μm is measured by the EBSD method, and the crystallite size of less than 0.5 μm is obtained by converting the value of the Rietveld method into the value of the EBSD method. Specifically, for Sample Nos. 7 and 13 to be described later, the average particle diameter of crystallites was measured by both the EBSD method and the Rietveld method, and the average value of correlation coefficients between the respective measurement results was taken as a conversion coefficient.

3-2: Fsss Particle Size of Tungsten Carbide

When the Fsss particle size of the powder containing tungsten carbide is greater than or equal to 0.3 μm and less than or equal to 1.5 μm, the handling (handleability) of the powder containing tungsten carbide is good, and the amount of adsorbed oxygen in the tungsten carbide does not increase. When an alloy is produced from a powder containing tungsten carbide if the amount of adsorbed oxygen is large, the adsorbed oxygen reacts with carbon in the tungsten carbide to consume the carbon, so that a proper ultrafine alloy structure is less likely to be obtained. If the Fsss particle size is within the above range, the amount of adsorbed oxygen is not increased, which is less likely to cause such a problem to occur. In order to obtain a fine alloy and further improve the handleability, the Fsss particle size is preferably greater than or equal to 0.5 μm and less than or equal to 1.2 μm, and most preferably greater than or equal to 0.5 μm and less than or equal to 1.0 μm.

3-3: Additive Amount of Chromium (Unit: % by Mass)

The content rate of chromium is preferably greater than or equal to 0.2% by mass. The content rate of chromium is preferably less than or equal to 2.5% by mass. If the content rate of chromium is greater than or equal to 0.2% by mass, the amount of chromium required for refining crystallites is achieved. If the content rate of chromium is greater than or equal to 2.5% by mass, the content rate exceeds the solid solution limit of chromium in the binder phase of the cemented carbide alloy, so that a third phase causing a decrease in strength may precipitate in the binder phase to become brittle. It should be noted that the word "may" indicates that there is a slight possibility, and does not mean that there is high probability.

If carbonization is performed in the presence of chromium, a part of tungsten is replaced by chromium. The chemical formula is estimated to be $(W,Cr)_2C$. A low carbide of tungsten is $W_2C$. $(W,Cr)_2C$ is obtained by replacing a part of the tungsten with chromium, which is a kind of composite carbide of tungsten and chromium.

The method for measuring the content rate of chromium is inductively coupled plasma (ICP). The following Table shows ICP analysis conditions.

TABLE 2

| Manufacturer | Shimadzu Corporation |
|---|---|
| Model name | ISPS-8100 |
| Plasma conditions | High frequency output: 1.2 kW |
| | Torch observation height: 11 mm |
| | Coolant gas: 14.0 dm$^3$/min |
| | Plasma gas: 1.20 dm$^3$/min |
| | Carrier gas: 0.80 dm$^3$/min |
| | scan step: 0.05 μm |
| Quantitative analysis element: Cr | Wavelength: 284.325 μm |
| | Integration time: 2.0 sec. |

ICP can measure the content rate of chromium, but it cannot detect whether a part of tungsten is replaced by chromium. By using transmission electron microscope (TEM)-energy dispersive X-ray spectrometry (EDX), a form in which chromium is contained in the powder can be confirmed.

3-4: Oxygen Amount (Unit: % by Mass)

The content rate of oxygen is preferably less than or equal to 0.3% by mass. More preferably, the content rate of oxygen is less than or equal to 0.2% by mass.

If the content rate of oxygen is less than or equal to 0.3% by mass, the reaction between carbon in tungsten carbide and oxygen during sintering of a cemented carbide alloy is easily suppressed. As a result, a proper alloy structure having few holes is obtained, which can provide increased transverse rupture strength. The content rate of oxygen is ideally 0% by mass, but it is realistically difficult since an oxide film is present on the surface of the powder. From the viewpoint of industrial production, the mass of oxygen is greater than or equal to 0.02% by mass. The measuring method is an infrared absorption method. For example, the mass of oxygen can be measured by the "infrared absorption method" of 13.4 of JIS H 1403 (2001) using a TC-600 type oxygen-nitrogen analyzer manufactured by LECO CORPORATION.

3-5: Distribution of Crystallite Size

The crystallite size (average particle diameter) of the tungsten carbide powder is taken as Y. If the abundance ratio of crystallites having a crystallite size within a range of Y±0.5Y is less than or equal to 85%, fine and coarse crystallites are mixed, and therefore, this causes Ostwald growth to occur, in which fine particles are taken into coarse particles during the sintering of a cemented carbide alloy, to cause abnormal growth, so that the grain size of the alloy is non-uniform. Meanwhile, when the abundance ratio of crystallites having a crystallite size within a range of Y±0.5Y exceeds 85%, an alloy structure having a uniform grain size is obtained.

For the distribution of the crystal grain size of tungsten carbide, the crystal orientation data obtained using the above-mentioned EBSD method is subjected to image analysis, whereby a histogram showing the abundance ratio of the particle size can be obtained per 0.1 μm interval within a crystallite size range of greater than or equal to 0.0 μm and less than or equal to 1.5 μm. From the obtained histogram, the crystallite size (average particle diameter) Y and (Y±0.5Y) are calculated. At this time, the crystallite size Y and (Y±0.5Y) are calculated up to the second decimal place. The abundance ratio of the crystal grain size within the range of (Y±0.5Y) is calculated, including the frequence of each of a class where (Y+0.5Y) is located, and a class where (Y−0.5Y) is located.

The composition of the powder containing tungsten carbide preferably contains chromium in an amount of greater than or equal to 0.2% by mass and less than or equal to 2.5% by mass, oxygen in an amount of less than or equal to 0.3% by mass, and the balance being substantially tungsten carbide, free carbon in an amount of less than or equal to 0.2% by mass, and unavoidable impurities. The unavoidable impurities are impurities inevitably mixed into a powder containing tungsten carbide from at least one of a raw material and a device during a producing process, and are, for example, aluminum, calcium, copper, magnesium, manganese, silicon, and tin. The content rates of these elements can be measured using ICP. As the content rate which does not adversely affect the cemented carbide alloy, the total of the contents of the elements is preferably less than or equal to 100 ppm. In particular, calcium and silicon and the like are apt to adversely affect the properties of the cemented carbide alloy. The content rate of the amount of free carbon can be measured, for example, by collecting insoluble matters generated when a powder containing tungsten carbide is dissolved with a mixed acid composed of nitric acid and phosphoric acid, and examining the insoluble matters using a carbon measuring device (WC230) manufactured by LECO CORPORATION.

When the proportion of tungsten carbide is greater than or equal to 90% by mass, the same effect can be obtained even if elements other than chromium and oxygen are contained. The powder containing tungsten carbide may contain, for example, at least one intentionally added additive element of titanium, vanadium, zirconium, niobium, molybdenum, hafnium, tantalum, iron, cobalt, and nickel, which is an additive of a conventional cemented carbide alloy. The content rates of these additive elements can be measured using ICP.

Therefore, the content rate of tungsten carbide (% by mass) can be calculated from a relational expression of 100−(content rate of chromium+content rate of oxygen+content rate of unavoidable impurities+content rate of additive element+content rate of free carbon). That is, herein, the content rate of tungsten carbide means not the content rate of only tungsten carbide but the content rate of a composition excluding chromium, oxygen, unavoidable impurities, additive element, and free carbon, calculated from the relational expression.

When a cemented carbide alloy is prepared by mixing the powder containing tungsten carbide with cobalt, the tungsten carbide in the cemented carbide alloy is finer than tungsten carbide in a cemented carbide alloy when a conventional powder having a grain size similar to that of the powder is used. This is also shown from the value of Hc of the cemented carbide alloy. Here, Hc (coercive force) indicates the intensity of an oppositely-oriented external magnetic field required for returning a magnetized magnetic body to a non-magnetized state. Therefore, in the case of the cemented carbide alloy, a cobalt phase is magnetized. As the tungsten carbide is finer, the cobalt phase is thinner, which provides increased intensity of the external magnetic field for returning the magnetized cobalt phase to a non-magnetized state. This provides a correlation between the alloy grain size (the thickness of the cobalt phase) and Hc. As the particle size of tungsten carbide is smaller, the thickness of the cobalt phase is thinner (the cemented carbide alloy has a fine structure), then the value of Hc increases. Hc (coercive force) can be measured using, for example, KOERZIMATCS-1.096 manufactured by FOERSTER. A method for measuring He (coercive force) is based on ISO 3326-1975.

4. Summary of Production Method

In one production method of the invention (hereinafter, referred to as an example production method), tungsten oxide is mixed with carbon, and the mixture is then heated in a furnace having a hydrogen atmosphere, followed by serially performing reduction and carbonization. By heating the mixture in the furnace having a hydrogen atmosphere to subject the tungsten oxide to hydrogen reduction, a powder containing tungsten carbide having an appropriate particle size similar to that of the conventional production method 1 of PTLs 1 and 2 can be obtained. By performing reduction and carbonization in a series of processes, reduction of tungsten oxide to tungsten and carbonization of tungsten continuously proceed, so that a time during which tungsten exists as a metal at a high temperature is shortened. As a result, ultrafine crystallites can be obtained.

In comparison between the conventional production method 2 and the example production method, in a reduction heat treatment in the conventional production method 2, tungsten oxide is reduced by carbon in a nitrogen atmosphere, whereby the conventional production method 2 provides a powder containing tungsten carbide having a finer grain size than that in the example production method (and the conventional production method 1) using hydrogen as a reducing agent.

The conventional production method 1 is a method in which a reduction step and a carbonization step are separately performed. By adjusting conditions in the reduction step, very fine tungsten can be produced. However, the reduced fine tungsten may react with oxygen in the air atmosphere to ignite due to an oxidation reaction on the surface of the fine tungsten. Meanwhile, in the example production method, tungsten oxide and a carbon powder are mixed in advance, and reduction and carbonization are continuously performed, which causes no possibility of ignition due to an oxidation reaction. As compared with the conventional production method 1, a time during which the tungsten particles are held at a high temperature is shortened as much as possible. This is presumed to suppress the coarsening of the crystallites due to recrystallization, to allow ultrafine crystallites to be provided.

The example production method is presumed to allow grain growth to an appropriate particle size using a hydrogen atmosphere as compared with the conventional production method 2.

The following Table shows comparison among the example production method, the conventional production method 1, and the conventional production method 2.

TABLE 3

|  | Example production method | Conventional production method 1 | Conventional production method 2 |
|---|---|---|---|
| Heat treatment | Reduction and carbonization are serial. | Reduction and carbonization are separate. | Reduction and carbonization are serial, but these have different atmospheres. |
| Reduction heat treatment atmosphere | Hydrogen | Hydrogen | Nitrogen |
| Heat treatment reducing agent | Hydrogen | Hydrogen | Carbon |
| Reduction time | Short | Long | Short |
| Carbonization heat treatment atmosphere | Hydrogen | Hydrogen, nitrogen, argon, or vacuum | Hydrogen |

TABLE 3-continued

|  | Example production method | Conventional production method 1 | Conventional production method 2 |
|---|---|---|---|
| Fsss (WC after carbonization) | Coarse | Coarse | Fine |
| Crystallite (WC after carbonization) | Fine | Coarse | Fine |

Details of Embodiment of the Present Invention

Production of Powder Containing Tungsten Carbide of Example

In SEM observation, $WO_3$ having an average particle diameter of about 3.0 μm, a carbon powder having an average particle diameter of about 1.0 μm, and chromium oxide ($Cr_2O_3$) having an average particle diameter of about 0.5 μm were used. The mass blending ratio of the $WO_3$, carbon powder, and chromium oxide ($Cr_2O_3$) was 93.6:5.2:1.2 for Sample Nos. 1 to 17, 94.7:5.0:0.3 for Sample Nos. 18, 20, 22, and 24, and 90.3:6.1:3.6 for Sample Nos. 19, 21, 23, and 25. The $WO_3$, the carbon powder, and the chromium oxide were mixed in a general mixer having a stirring blade under mixing conditions in Tables 4 to 7. In the method for mixing the tungsten oxide, the carbon powder, and the chromium oxide, any of mixers may be used, or the tungsten oxide, the carbon powder, and the chromium oxide may be uniformly mixed.

The mixture was heat-treated according to "heat treatment conditions using rotary furnace" in Tables 4 to 7, and crushed according to "crush conditions" in Tables 4 to 7 to prepare Sample Nos. 1 to 25 in Tables 4 to 7.

TABLE 4

| Sample No. | Mixing conditions using mixer | Heat treatment conditions using rotary furnace | WC crushing conditions | Remarks |
|---|---|---|---|---|
| 1 | Number of rotations: 500 rpm Mixing time: 5 minutes | Hydrogen atmosphere Temperature: 1080° C. Heat treatment time: 25 minutes | Ball mill Media: φ20 mm Nitrogen atmosphere | Powder containing tungsten carbide of Example |
| 2 | Number of rotations: 500 rpm Mixing time: 5 minutes | Hydrogen atmosphere Temperature: 1080° C. Heat treatment time: 10 minutes | Ball mill Media: φ20 mm Nitrogen atmosphere |  |
| 3 | Number of rotations: 500 rpm Mixing time: 5 minutes | Hydrogen atmosphere Temperature: 1090° C. Heat treatment time: 20 minutes | Ball mill Media: φ20 mm Air atmosphere |  |
| 4 | Number of rotations: 500 rpm Mixing time: 5 minutes | Hydrogen atmosphere Temperature: 1090° C. Heat treatment time: 10 minutes | Ball mill Media: φ20 mm Air atmosphere |  |
| 5 | Number of rotations: 500 rpm Mixing time: 5 minutes | Hydrogen atmosphere Temperature: 1100° C. Heat treatment time: 20 minutes | Ball mill Media: φ20 mm Air atmosphere |  |

TABLE 4-continued

| Sample No. | Mixing conditions using mixer | Heat treatment conditions using rotary furnace | WC crushing conditions | Remarks |
|---|---|---|---|---|
| 6 | Number of rotations: 500 rpm Mixing time: 5 minutes | Hydrogen atmosphere Temperature: 1100° C. Heat treatment time: 25 minutes | Ball mill Media: φ20 mm Air atmosphere | |
| 7 | Number of rotations: 500 rpm Mixing time: 5 minutes | Hydrogen atmosphere Temperature: 1150° C. Heat treatment time: 20 minutes | Mortar | |

TABLE 5

| Sample No. | Mixing conditions using mixer | Heat treatment conditions using rotary furnace | WC crushing conditions | Remarks |
|---|---|---|---|---|
| 8 | Number of rotations: 500 rpm Mixing time: 5 minutes | Hydrogen atmosphere Temperature: 1200° C. Heat treatment time: 20 minutes | Ball mill Media: φ20 mm Air atmosphere | Powder containing tungsten carbide of Example |
| 9 | Number of rotations: 500 rpm Mixing time: 5 minutes | Hydrogen atmosphere Temperature: 1200° C. Heat treatment time: 25 minutes | Ball mill Media: φ20 mm Air atmosphere | |
| 10 | Number of rotations: 500 rpm Mixing time: 5 minutes | Hydrogen atmosphere Temperature: 1200° C. Heat treatment time: 10 minutes | Ball mill Media: φ20 mm Air atmosphere | |
| 11 | Number of rotations: 500 rpm Mixing time: 5 minutes | Hydrogen atmosphere Temperature: 1300° C. Heat treatment time: 20 minutes | Ball mill Media: φ20 mm Air atmosphere | |
| 12 | Number of rotations: 500 rpm Mixing time: 5 minutes | Hydrogen atmosphere Temperature: 1300° C. Heat treatment time: 10 minutes | Ball mill Media: φ20 mm Air atmosphere | |
| 13 | Number of rotations: 500 rpm Mixing time: 5 minutes | Hydrogen atmosphere Temperature: 1400° C. Heat treatment time: 25 minutes | Ball mill Media: φ20 mm Air atmosphere | |
| 14 | Number of rotations: 500 rpm Mixing time: 5 minutes | Hydrogen atmosphere Temperature: 1400° C. Heat treatment time: 15 minutes | Ball mill Media: φ20 mm Air atmosphere | |

TABLE 6

| Sample No. | Mixing conditions using mixer | Heat treatment conditions using rotary furnace | WC crushing conditions | Remarks |
|---|---|---|---|---|
| 15 | Number of rotations: 500 rpm Mixing time: 30 minutes | Hydrogen atmosphere Temperature: 1090° C. Heat treatment time: 20 minutes | Ball mill Media: φ20 mm Air atmosphere | Powder containing tungsten carbide of Example |
| 16 | Number of rotations: 500 rpm Mixing time: 30 minutes | Hydrogen atmosphere Temperature: 1200° C. Heat treatment time: 25 minutes | Ball mill Media: φ20 mm Air atmosphere | |
| 17 | Number of rotations: 500 rpm Mixing time: 30 minutes | Hydrogen atmosphere Temperature: 1400° C. Heat treatment time: 25 minutes | Ball mill Media: φ20 mm Air atmosphere | |

TABLE 7

| Sample No. | Mixing conditions using mixer | Heat treatment conditions using rotary furnace | WC crushing conditions | Remarks |
|---|---|---|---|---|
| 18 | Number of rotations: 500 rpm Mixing time: 5 minutes | Hydrogen atmosphere Temperature: 1080° C. Heat treatment time: 25 minutes | Ball mill Media: φ20 mm Nitrogen atmosphere | Powder containing tungsten carbide of Example |
| 19 | Number of rotations: 500 rpm Mixing time: 5 minutes | Hydrogen atmosphere Temperature: 1080° C. Heat treatment time: 25 minutes | Ball mill Media: φ20 mm Nitrogen atmosphere | |
| 20 | Number of rotations: 500 rpm Mixing time: 5 minutes | Hydrogen atmosphere Temperature: 1090° C. Heat treatment time: 20 minutes | Ball mill Media: φ20 mm Air atmosphere | |
| 21 | Number of rotations: 500 rpm Mixing time: 5 minutes | Hydrogen atmosphere Temperature: 1090° C. Heat treatment time: 20 minutes | Ball mill Media: φ20 mm Air atmosphere | |
| 22 | Number of rotations: 500 rpm Mixing time: 5 minutes | Hydrogen atmosphere Temperature: 1200° C. Heat treatment time: 25 minutes | Ball mill Media: φ20 mm Air atmosphere | |
| 23 | Number of rotations: 500 rpm Mixing time: 5 minutes | Hydrogen atmosphere Temperature: 1200° C. Heat treatment time: 25 minutes | Ball mill Media: φ20 mm Air atmosphere | |
| 24 | Number of rotations: 500 rpm Mixing time: 5 minutes | Hydrogen atmosphere Temperature: 1400° C. Heat treatment time: 25 minutes | Ball mill Media: φ20 mm Air atmosphere | |

TABLE 7-continued

| Sample No. | Mixing conditions using mixer | Heat treatment conditions using rotary furnace | WC crushing conditions | Remarks |
|---|---|---|---|---|
| 25 | Number of rotations: 500 rpm Mixing time: 5 minutes | Hydrogen atmosphere Temperature: 1400° C. Heat treatment time: 25 minutes | Ball mill Media: φ20 mm Air atmosphere | |

Production of Powder Containing Tungsten Carbide by Conventional Production Method 1

In order to prepare each of Sample Nos. 26 to 29, 300 g of $WO_3$ was heat-treated and reduced (hydrogen atmosphere, see Table 8) on a metal tray so that a thickness was set to about 5 mm, to obtain a tungsten powder. Table 8 particularly shows a maximum temperature range of a reduction reaction. After the temperature was raised, the tungsten powder was cooled in a cooling zone of a heat treatment furnace.

| Sample No. | Reduction conditions | Remarks |
|---|---|---|
| 26 | Hydrogen atmosphere Temperature: 860° C. 50 minutes | Powder containing tungsten carbide obtained by conventional production method 1 |
| 27 | Hydrogen atmosphere Temperature: 860° C. 90 minutes | |
| 28 | Hydrogen atmosphere Temperature: 870° C. 90 minutes | |
| 29 | Hydrogen atmosphere Temperature: 900° C. 90 minutes | |

Thereafter, the tungsten powder reduced under a condition shown in each of Sample Nos. 26 to 29 of Table 8, the carbon powder, and the chromium oxide ($Cr_2O_3$) were weighed so that a mass ratio was set to 92.2:6.4:1.4, and mixed at 500 rpm for 10 minutes using the above-mentioned mixer. The mixture was heat-treated (hydrogen atmosphere, 1000 to 1800° C., 30 to 300 minutes) on a carbon tray in a hydrogen atmosphere so that a thickness was set to 20 mm, to carbonize tungsten. Tungsten carbide was crushed in the above-mentioned ball mill to obtain a powder containing tungsten carbide of each of Sample Nos. 26 to 29 in Table 9 (conventional production method 1). The "heat treatment conditions" in Table 9 particularly indicate a maximum temperature range of a carbonization reaction. After the temperature was raised, the powder containing tungsten carbide was cooled in a cooling zone of a heat treatment furnace.

TABLE 9

| Sample No. | Mixing conditions using mixer | Heat treatment conditions | WC crushing conditions | Remarks |
|---|---|---|---|---|
| 26 | Number of rotations: 500 rpm Mixing time: 10 minutes | Hydrogen atmosphere Temperature: 1080° C. Heat treatment time: 60 minutes | Ball mill Media: φ20 mm Air atmosphere | Powder containing tungsten carbide obtained by conventional production method 1 |
| 27 | Number of rotations: 500 rpm Mixing time: 10 minutes | Vacuum atmosphere Temperature: 1500° C. Heat treatment time: 180 minutes | Ball mill Media: φ20 mm Air atmosphere | |
| 28 | Number of rotations: 500 rpm Mixing time: 10 minutes | Vacuum atmosphere Temperature: 1700° C. Heat treatment time: 180 minutes | Ball mill Media: φ20 mm Air atmosphere | |
| 29 | Number of rotations: 500 rpm Mixing time: 10 minutes | Vacuum atmosphere Temperature: 1800° C. Heat treatment time: 180 minutes | Ball mill Media: φ20 mm Air atmosphere | |

Production of Powder Containing Tungsten Carbide by Conventional Production Method 2

$WO_3$, a carbon powder, and chromium oxide ($Cr_2O_3$) used in the conventional production method 1 were blended at a mass ratio of 83.3:15.8:0.9, and mixed at 500 rpm in a general mixer having a stirring blade as described above for 5 minutes. The mixture was subjected to a reduction heat treatment and a carbonization heat treatment under various conditions shown in Table 10, and then crushed in a ball mill shown in Table 10 to prepare Sample Nos. 30 to 32 as Comparative Examples.

TABLE 10

| Sample No. | Reduction heat treatment conditions | Carbonization heat treatment conditions | Crushing conditions | Remarks |
|---|---|---|---|---|
| 30 | Nitrogen atmosphere Temperature: 1250° C. Heat treatment time: 15 minutes | Hydrogen atmosphere Temperature: 1400° C. Heat treatment time: 20 minutes | Ball mill Media: φ20 mm Air atmosphere | Powder containing tungsten carbide obtained by conventional production method 2 |
| 31 | Nitrogen atmosphere Temperature: 1350° C. Heat treatment time: 15 minutes | Hydrogen atmosphere Temperature: 1550° C. Heat treatment time: 20 minutes | Ball mill Media: φ20 mm Air atmosphere | |
| 32 | Nitrogen atmosphere Temperature: 1400° C. Heat treatment time: 15 minutes | Hydrogen atmosphere Temperature: 1600° C. Heat treatment time: 20 minutes | Ball mill Media: φ20 mm Air atmosphere | |

In the obtained powder containing tungsten carbide (Sample Nos. 1 to 32), the cross section of the particles was observed by SEM. The crystallite size and the distribution of the crystallite size were analyzed by the EBSD method and the Rietveld method. In the powder containing tungsten carbide, the content rate of chromium, the content rate of oxygen, and the content rate of free carbon were measured, and the content rate of tungsten carbide was calculated from the measurement results. The results are shown in Tables 11 to 13. In the powder, the blending of the raw materials is adjusted so that the content rate of free carbon is set to be less than or equal to 0.2% by mass. Furthermore, for the content rate of the unavoidable impurities in the powder prepared in each of the example production method, the conventional production method 1, and the conventional production method 2, the content rate of each of aluminum, copper, magnesium, and manganese was less than or equal to 10 ppm, and the content rate of each of calcium, silicon, and tin was less than or equal to 20 ppm. That is, the total content rate of the unavoidable impurities was less than or equal to 100 ppm. If the unavoidable impurities do not have sizes of foreign matters in the alloy structure, a proper cemented carbide alloy can be obtained by setting the content rate of the unavoidable impurities within the range.

TABLE 11

| Sample No. | Fsss particle size of powder containing tungsten carbide (μm) | Abundance ratio of crystallites having crystallite size within range of Y ± 0.5Y (%) | Crystallite size of powder containing tungsten carbide (average particle diameter) (μm) | Chromium (% by mass) | Oxygen (% by mass) | Free carbon (% by mass) | Tungsten carbide (% by mass) | Remarks |
|---|---|---|---|---|---|---|---|---|
| 1 | 0.30 | — | 0.23 | 0.86 | 0.28 | 0.19 | 98.64 | Powder |
| 2 | 0.30 | — | 0.13 | 0.89 | 0.26 | 0.17 | 98.66 | containing |
| 3 | 0.50 | 85.2 | 0.23 | 0.92 | 0.20 | 0.15 | 98.73 | tungsten |
| 4 | 0.50 | 86.1 | 0.15 | 0.88 | 0.18 | 0.17 | 98.75 | carbide of |
| 5 | 0.62 | 86.3 | 0.24 | 0.94 | 0.17 | 0.20 | 98.68 | Example |
| 6 | 0.64 | 85.8 | 0.26 | 0.91 | 0.08 | 0.16 | 98.82 | |
| 7 | 0.77 | 85.3 | 0.26 | 0.92 | 0.15 | 0.15 | 98.78 | |
| 8 | 0.98 | 85.2 | 0.28 | 0.89 | 0.10 | 0.13 | 98.88 | |
| 9 | 1.01 | 85.5 | 0.30 | 0.91 | 0.16 | 0.08 | 98.85 | |
| 10 | 1.02 | 86.1 | 0.20 | 0.95 | 0.15 | 0.12 | 98.78 | |
| 11 | 1.20 | 85.1 | 0.32 | 0.90 | 0.12 | 0.10 | 98.84 | |
| 12 | 1.20 | 85.3 | 0.22 | 0.94 | 0.10 | 0.11 | 98.82 | |
| 13 | 1.50 | 85.0 | 0.33 | 0.93 | 0.07 | 0.08 | 98.86 | |
| 14 | 1.50 | 85.4 | 0.25 | 0.94 | 0.08 | 0.10 | 98.84 | |

TABLE 12

| Sample No. | Fsss particle size of powder containing tungsten carbide (μm) | Abundance ratio of crystallites having crystallite size within range of Y ± 0.5Y (%) | Crystallite size of powder containing tungsten carbide (average particle diameter) (μm) | Chromium (% by mass) | Oxygen (% by mass) | Free carbon (% by mass) | Tungsten carbide (% by mass) | Remarks |
|---|---|---|---|---|---|---|---|---|
| 15 | 0.50 | 90.8 | 0.23 | 0.86 | 0.17 | 0.12 | 98.85 | Powder |
| 16 | 1.00 | 91.2 | 0.30 | 0.88 | 0.17 | 0.10 | 98.85 | containing |
| 17 | 1.50 | 91.0 | 0.33 | 0.92 | 0.12 | 0.09 | 98.87 | tungsten |
| 18 | 0.30 | — | 0.23 | 0.21 | 0.29 | 0.18 | 99.32 | carbide of |
| 19 | 0.30 | — | 0.21 | 2.48 | 0.28 | 0.13 | 97.10 | Example |
| 20 | 0.50 | 85.2 | 0.25 | 0.20 | 0.20 | 0.14 | 99.46 | |
| 21 | 0.50 | 85.0 | 0.23 | 2.50 | 0.18 | 0.12 | 97.19 | |
| 22 | 1.01 | 85.3 | 0.30 | 0.20 | 0.15 | 0.10 | 99.55 | |
| 23 | 1.00 | 85.2 | 0.28 | 2.50 | 0.16 | 0.11 | 97.22 | |
| 24 | 1.50 | 85.3 | 0.35 | 0.22 | 0.12 | 0.09 | 99.57 | |
| 25 | 1.50 | 85.6 | 0.33 | 2.49 | 0.11 | 0.07 | 97.32 | |

TABLE 13

| Sample No. | Fsss particle size of powder containing tungsten carbide (μm) | Abundance ratio of crystallites having crystallite size within range of Y ± 0.5Y (%) | Crystallite size of powder containing tungsten carbide (average particle diameter) (μm) | Chromium (% by mass) | Oxygen (% by mass) | Free carbon (% by mass) | Tungsten carbide (% by mass) | Remarks |
|---|---|---|---|---|---|---|---|---|
| 26 | 0.58 | — | 0.32 | 0.84 | 0.15 | 0.11 | 98.90 | Powder containing |
| 27 | 0.94 | — | 0.36 | 0.85 | 0.11 | 0.12 | 98.91 | tungsten carbide |
| 28 | 1.20 | — | 0.38 | 0.90 | 0.09 | 0.10 | 98.90 | obtained by conventional |
| 29 | 1.50 | — | 0.43 | 0.88 | 0.07 | 0.08 | 98.97 | production method 1 |
| 30 | 0.25 | — | 0.25 | 0.84 | 0.37 | 0.11 | 98.68 | Powder containing |

TABLE 13-continued

| Sample No. | Fsss particle size of powder containing tungsten carbide (μm) | Abundance ratio of crystallites having crystallite size within range of Y ± 0.5Y (%) | Crystallite size of powder containing tungsten carbide (average particle diameter) (μm) | Chromium (% by mass) | Oxygen (% by mass) | Free carbon (% by mass) | Tungsten carbide (% by mass) | Remarks |
|---|---|---|---|---|---|---|---|---|
| 31 | 0.55 | — | 0.28 | 0.86 | 0.31 | 0.14 | 98.69 | tungsten carbide obtained by conventional production method 2 |
| 32 | 0.70 | — | 0.30 | 0.89 | 0.15 | 0.12 | 98.84 | |

The crystallite sizes of Sample Nos. 1, 2, 18, and 19 are values obtained by converting the values obtained by the Rietveld method using the conversion coefficients. By the Rietveld method, the abundance ratio of crystallites having a crystallite size within a range of (Y±0.5Y) cannot be measured, but in Sample Nos. 1, 2, 18, and 19, the abundance ratio of crystallites having a crystallite size within a range of (Y±0.5Y) is estimated to be greater than or equal to 85% from the tendency of Sample Nos. 3 to 17 and 20 to 25.

Figure 2:
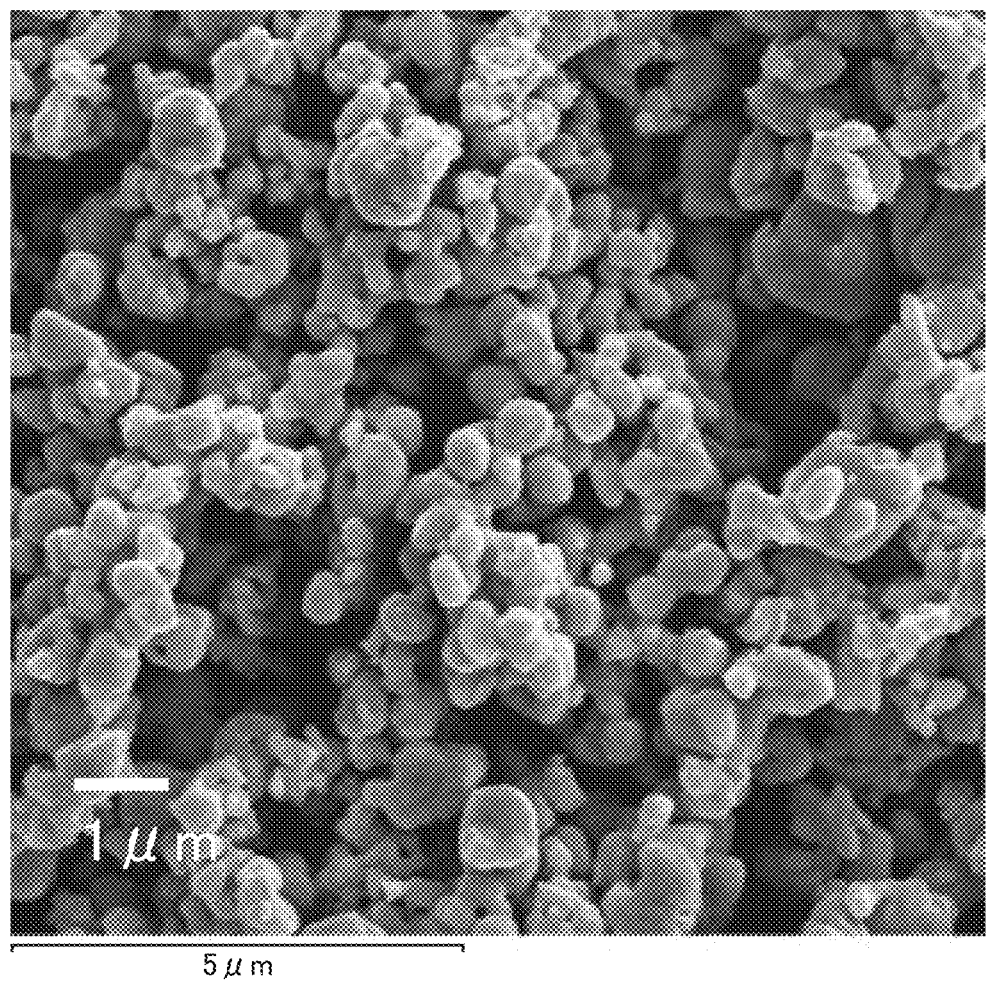
FIG. 2 is a SEM photograph showing the appearance of a powder containing tungsten carbide of Sample No. 27 obtained by a conventional production method 1.

FIG. 1 is a SEM photograph showing the appearance of a powder containing tungsten carbide of Sample No. 8 of Example. FIG. 2 is a SEM photograph showing the appearance of a powder containing tungsten carbide of Sample No. 27 obtained by a conventional production method 1. As shown in FIGS. 1 and 2, the Sample Nos. 8 and 27 have a similar Fsss particle size, which makes it difficult to distinguish them in appearance.

Furthermore, when a form of chromium in a powder was examined using an X-ray diffractometer, a peak which was considered to be composed of tungsten-chromium-carbon was observed.

Figure 3:
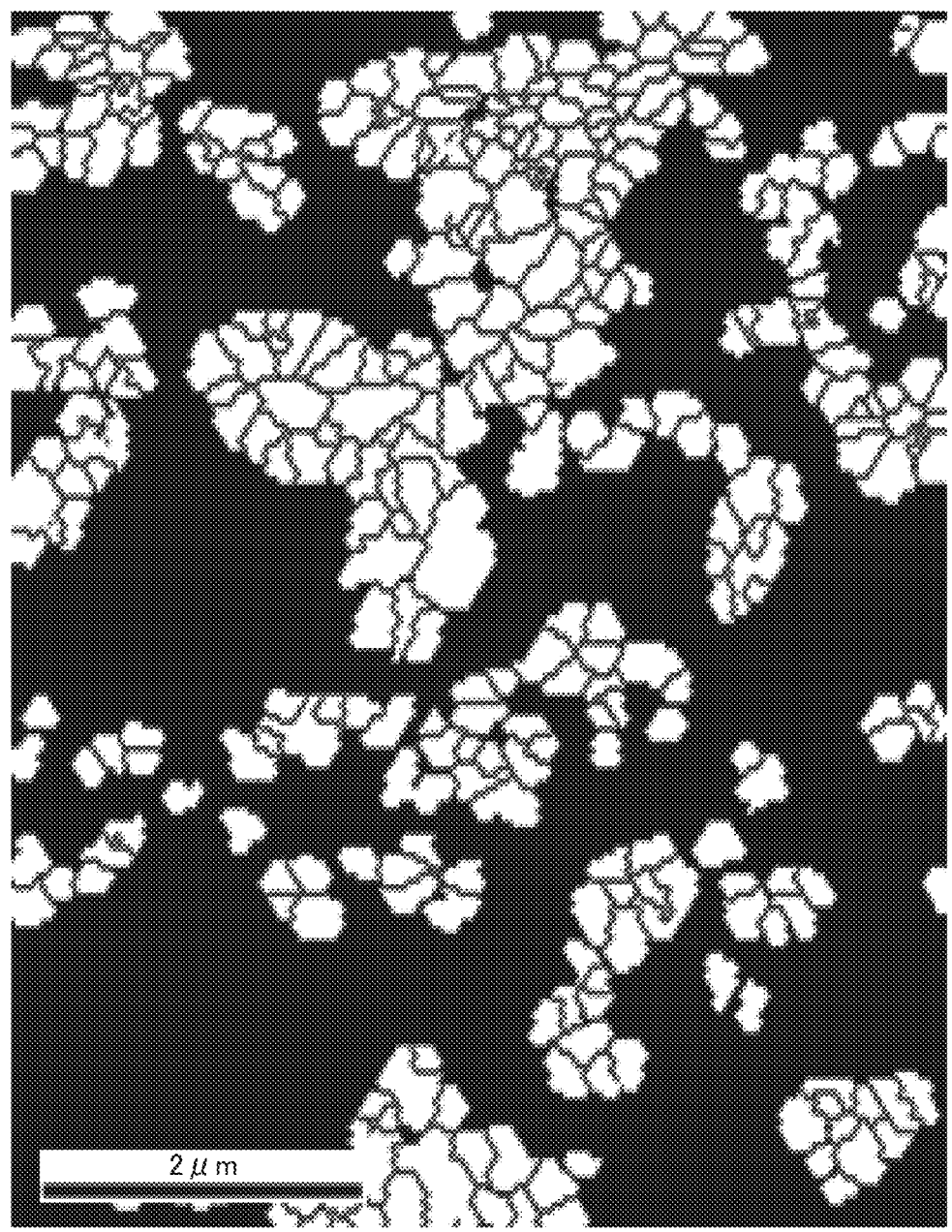
FIG. 3 is a crystallite mapping image of a powder containing tungsten carbide of Sample No. 8 of Example.
Figure 4:
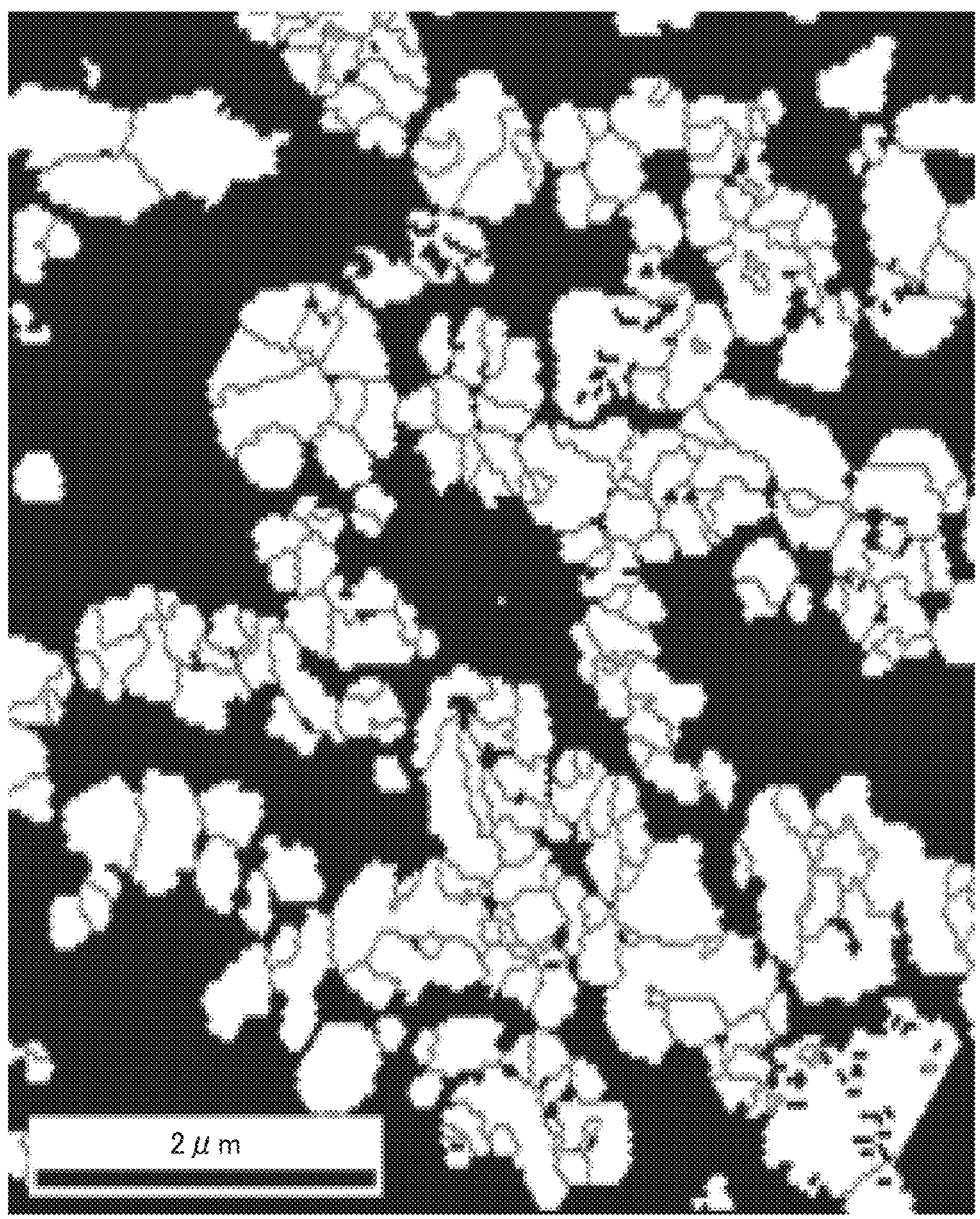
FIG. 4 is a crystallite mapping image of a tungsten powder of Sample No. 27 obtained by a conventional production method 1.

FIG. 3 is a crystallite mapping image of a powder containing tungsten carbide of Sample No. 8 of Example. FIG. 4 is a crystallite mapping image of a tungsten powder of Sample No. 27 obtained by a conventional production method 1. As shown in FIGS. 3 and 4, it is found that the number of crystallites constituting one of tungsten carbide particles of Sample No. 8 is greater than those constituting one of tungsten carbide particles of Sample No. 27.

Figure 5:
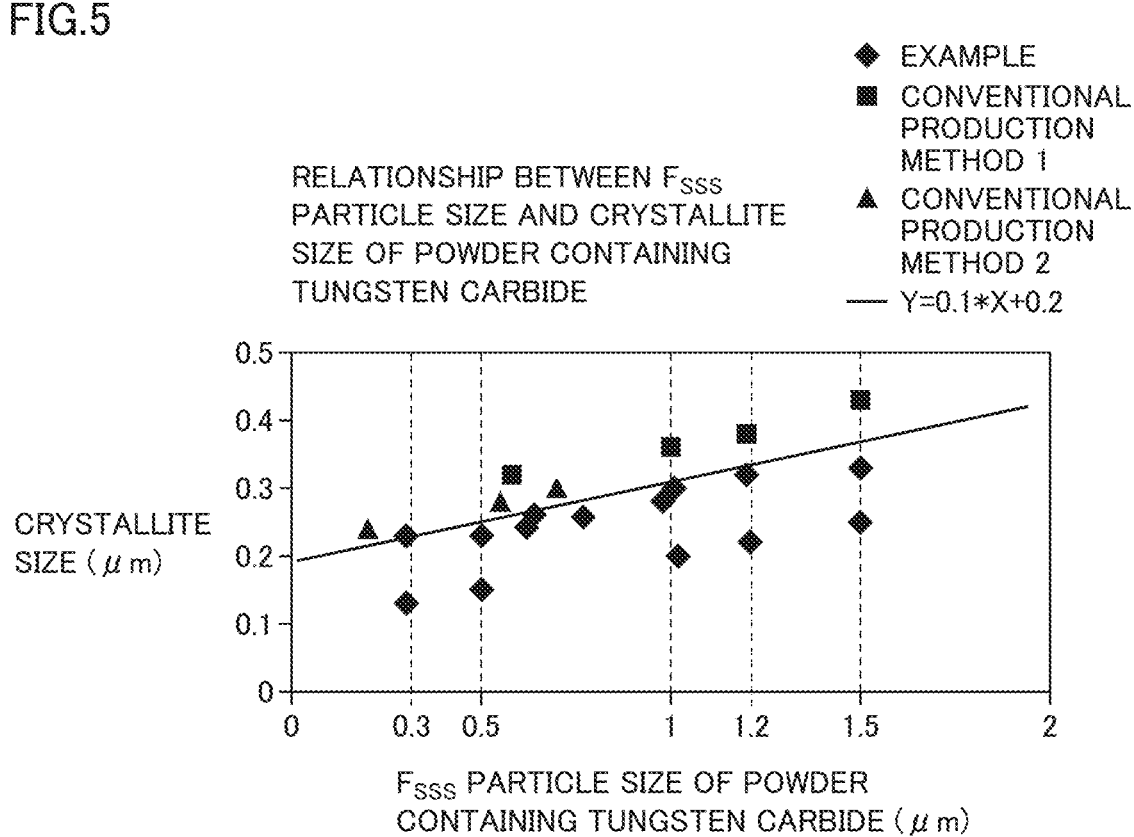
FIG. 5 is a graph showing a relationship between an Fsss particle size of a powder containing tungsten carbide and a crystallite size (average particle diameter) of a cross section of the powder containing tungsten carbide obtained by an EBSD method in each of Sample Nos. 1 to 14, 26 to 29, and 30 to 32.

FIG. 5 is a graph showing the relationship between the Fsss particle size of a powder containing tungsten carbide and the crystallite size (average particle diameter) of the cross section of the powder containing tungsten carbide obtained by the EBSD method and the Rietveld method in each of Sample Nos. 1 to 14, 26 to 29, and 30 to 32. It can be confirmed that the powder containing tungsten carbide of Example has a finer crystallite size in the same Fsss particle size than that of the powder containing tungsten carbide in each of the conventional production method 1 and the conventional production method 2. Therefore, when the Fsss particle size is 0.3 to 1.5 μm, the relationship between the Fsss particle size X and crystallite size Y of the powder containing tungsten carbide of Example is represented by the following equation: $Y \leq 0.1 \times X + 0.20$.

Figure 6:
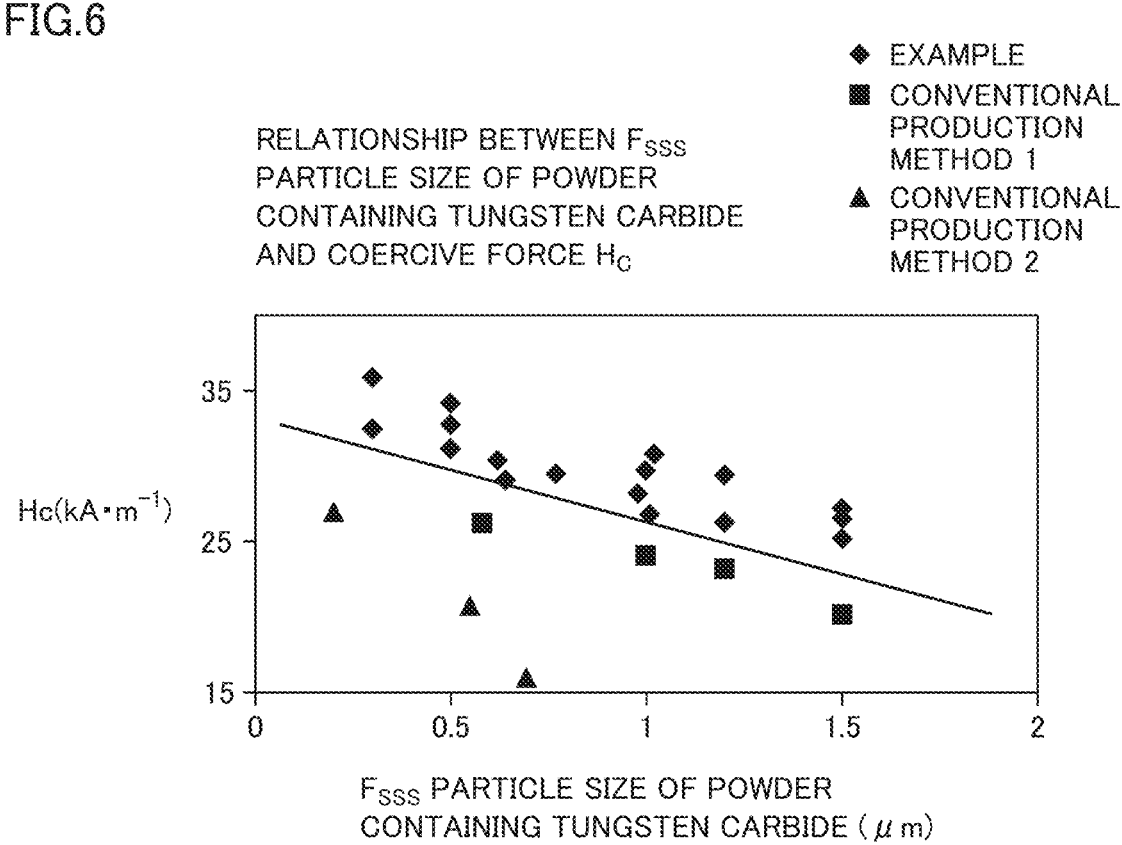
FIG. 6 is a graph showing a relationship between the Fsss particle size of a powder containing tungsten carbide and Hc (coercive force) in each of Sample No. 1 to 17, 26 to 29, and 30 to 32.

10% by mass of a Co powder was blended with the powder containing tungsten carbide of each of Sample Nos. 1 to 32, followed by mixing in a mixer mill for 5 minutes. The mixture was press-molded under a pressure of 98 MPa, and the molded product was sintered in a vacuum at 1380° C. for 1 hour. The coercive forces (Hc) of the obtained cemented carbide alloys were measured. The coercive forces are shown in Tables 14 and 15. FIG. 6 shows the relationship between the Fsss particle size of a powder containing tungsten carbide and the coercive force (Hc) in each of Sample No. 1 to 17, 26 to 29, and 30 to 32.

TABLE 14

| Sample No. | Fsss particle size of powder containing tungsten carbide (μm) X | Hc (kA/m) | Remarks |
|---|---|---|---|
| 1 | 0.30 | 32.5 | Powder containing tungsten carbide of Example |
| 2 | 0.30 | 35.9 | |
| 3 | 0.50 | 31.2 | |
| 4 | 0.50 | 34.2 | |
| 5 | 0.62 | 30.4 | |
| 6 | 0.64 | 29.1 | |
| 7 | 0.77 | 29.5 | |
| 8 | 0.98 | 28.2 | |
| 9 | 1.01 | 26.8 | |
| 10 | 1.02 | 30.8 | |
| 11 | 1.20 | 26.3 | |
| 12 | 1.20 | 29.4 | |
| 13 | 1.50 | 25.2 | |
| 14 | 1.50 | 27.2 | |
| 15 | 0.50 | 32.8 | |
| 16 | 1.00 | 29.7 | |
| 17 | 1.50 | 26.5 | |
| 18 | 0.30 | 31.9 | |
| 19 | 0.30 | 32.6 | |
| 20 | 0.50 | 30.2 | |
| 21 | 0.50 | 31.0 | |
| 22 | 1.01 | 27.4 | |
| 23 | 1.00 | 28.1 | |
| 24 | 1.50 | 24.8 | |
| 25 | 1.50 | 25.3 | |

TABLE 15

| Sample No. | Fsss particle size of powder containing tungsten carbide (μm) X | Hc (kA/m) | Remarks |
|---|---|---|---|
| 26 | 0.58 | 26.3 | Powder containing tungsten carbide obtained by conventional production method 1 |
| 27 | 0.94 | 24.1 | |
| 28 | 1.20 | 23.3 | |
| 29 | 1.50 | 20.2 | |
| 30 | 0.25 | 26.1 | Powder containing tungsten carbide obtained by conventional production method 2 |
| 31 | 0.55 | 20.8 | |
| 32 | 0.70 | 15.8 | |

FIG. 6 is a graph showing the relationship between the Fsss particle size of a powder containing tungsten carbide and Hc (coercive force) in each of Sample Nos. 1 to 17, 26 to 29, and 30 to 32. From FIG. 6, it is found that, when samples having a similar Fsss particle size are contrasted with each other, the Hc of the cemented carbide alloy according to Example is greater than the Hc of the cemented carbide alloy according to the conventional production methods 1 and 2. For example, for Sample Nos. 5 and 26 in which the Fsss particle size of the powder containing tungsten carbide is about 0.6 the He of the cemented carbide alloy composed of the tungsten carbide of the conventional production method 1 (Sample No. 26) is 26.3 kA/m, whereas the He of the cemented carbide alloy composed of the tungsten carbide of Example (Sample No. 5) is 30.4 kA/m, so that the cemented carbide produced from the powder containing tungsten carbide of Example is said to have a fine structure.

It is found that the He is particularly great in Sample Nos. 1 to 12, 15, 16, and 18 to 23 in which the Fsss particle size (μm) X of the powder containing tungsten carbide is less than or equal to 1.2 μm. That is, it is found that the alloy obtained in the example production method is finer than that in the conventional production methods 1 and 2.

In each of Sample Nos. 18 and 19 in which the amount of chromium added was different from that of Sample No. 1, Sample Nos. 20 and 21 in which the amount of chromium added was different from that of Sample No. 3, Sample Nos. 22 and 23 in which the amount of chromium added was different from that of Sample No. 8, and Sample Nos. 24 and 25 in which the amount of chromium added was different from that of Sample No. 13, the Hc (coercive force) was greater than that of the powder containing tungsten carbide having a similar Fsss particle size in each of the conventional production method 1 and the conventional production method 2 shown in FIG. 6. That is, it was confirmed that, when the content rate of chromium is within a range of greater than or equal to 0.2% by mass and less than or equal to 2.5% by mass, the Hc (coercive force) can be increased. It could be confirmed that, as a heat treatment temperature increases, the Fsss particle size and the Hc (coercive force) decrease.

Furthermore, a cemented carbide alloy was prepared from the powder containing tungsten carbide of each of Sample Nos. 8 and 27. Specifically, 10% by mass of a Co powder was blended with the powder containing tungsten carbide of each of Sample Nos. 8 and 27, followed by wet-mixing in ethanol for 8 hours using an attritor. The mixed powder was dried, and the dried powder was press-molded under a pressure of 98 MPa to prepare a green compact having a length of 10 mm, a width of 30 mm, and a height of 5 mm. The green compact was sintered in a vacuum at 1380° C. for 1 hour. The hardness and transverse rupture strength of the cemented carbide alloy after sintering were evaluated. The results are shown in Table 16.

TABLE 16

| Alloy composition | Tungsten carbide-0.9% Cr—10% Co | |
|---|---|---|
| Powder containing tungsten carbide | Example (Sample No. 8) | Conventional production method 1 (Sample No. 27) |
| Fsss particle size of powder [μm] | 0.98 | 0.94 |
| Hardness HRA [—] | 92.7 | 91.3 |
| Transverse rupture strength [GPa] (average) | 3.5 | 2.2 |

From Table 16, it was found that the cemented carbide alloy produced from the powder containing tungsten carbide of Example (Sample No. 8) has greater hardness and transverse rupture strength than those of the cemented carbide alloy produced from the powder containing tungsten carbide of the conventional production method 1 (Sample No. 27). This is considered to be because the powder containing tungsten carbide of Example has a small crystallite size to provide the cemented carbide alloy having an ultrafine structure.

The cemented carbide alloy produced from the powder containing tungsten carbide of Sample No. 8 of Example and the cemented carbide alloy produced from the powder containing tungsten carbide of Sample No. 27 obtained by the conventional production method 1 were observed. The results are shown in FIGS. 7 and 8.

Figure 7:
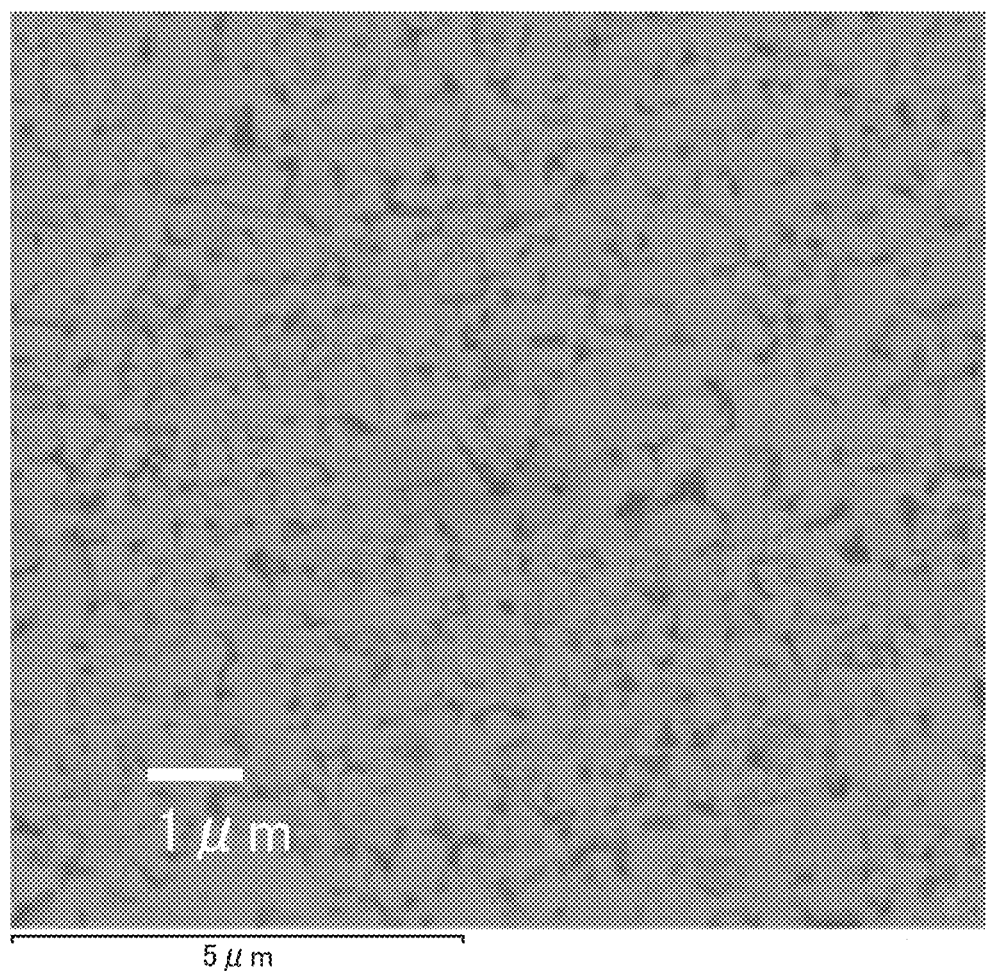
FIG. 7 is a photograph of a metallographic structure of a cemented carbide alloy produced from a powder containing tungsten carbide of Sample No. 8 of Example.
Figure 8:
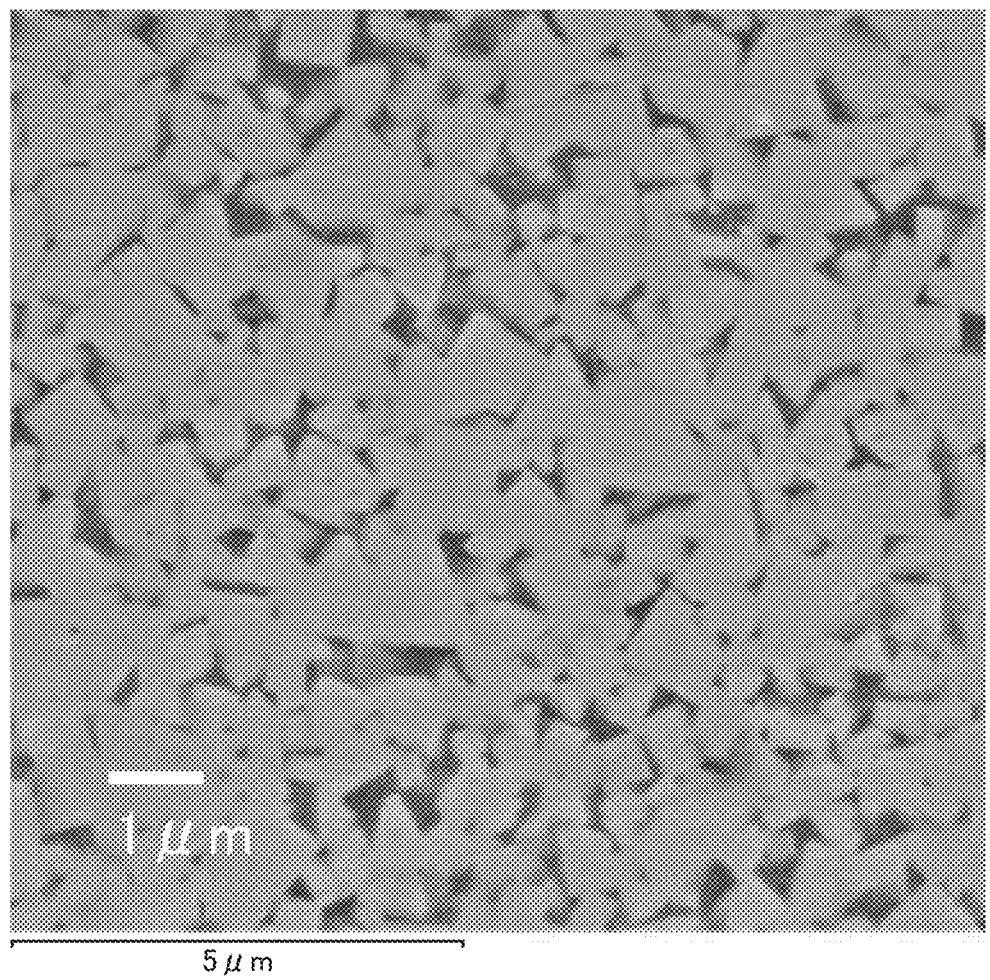
FIG. 8 is a photograph of the metallographic structure of a cemented carbide alloy produced from a powder containing tungsten carbide of Sample No. 27 obtained by a conventional production method 1.

FIG. 7 is a photograph of the metallographic structure of a cemented carbide alloy produced from a powder containing tungsten carbide of Sample No. 8 of Example. FIG. 8 is a photograph of the metallographic structure of a cemented carbide alloy produced from a powder containing tungsten carbide of Sample No. 27 obtained by a conventional production method 1. As shown in FIGS. 7 and 8, the metal structure of the cemented carbide alloy produced from the powder containing tungsten carbide of Example was finer than the metal structure of the cemented carbide alloy produced from the powder containing tungsten carbide of Sample No. 27 obtained by the conventional production method 1.

Furthermore, a cemented carbide alloy was prepared from the powder containing tungsten carbide of each of Sample Nos. 1 and 30. Specifically, 10% by mass of a Co powder was blended with the powder containing tungsten carbide of each of Sample Nos. 1 and 30, followed by wet-mixing in ethanol for 8 hours using an attritor. The mixed powder was dried, and the dried powder was press-molded under a pressure of 98 MPa to prepare a green compact having a length of 10 mm, a width of 30 mm, and a height of 5 mm. The green compact was sintered in a vacuum at 1380° C. for 1 hour. The hardness and transverse rupture strength of the cemented carbide alloy after sintering were evaluated. The results are shown in Table 17.

TABLE 17

| Alloy composition | Tungsten carbide-0.9% Cr—10% Co | |
|---|---|---|
| Powder containing tungsten carbide | Example (Sample No. 1) | Conventional production method 2 (Sample No. 30) |
| Oxygen (% by mass) | 0.28 | 0.37 |
| Fsss particle size of powder [μm] | 0.3 | 0.25 |
| Hardness HRA [—] | 94.8 | 93.2 |
| Transverse rupture strength [GPa] (average) | 4.3 | 3.8 |

As shown in Table 17, the powder containing tungsten carbide obtained by the production method of Example has a greater Fsss particle size, a lower oxygen content rate, and both higher hardness and transverse rupture strength as alloy properties than those of the powder containing tungsten carbide obtained by the conventional production method 2. Therefore, it can be said that a proper alloy structure is obtained, which provides improved properties.

When a cemented carbide alloy was prepared under the same conditions using the powder containing tungsten carbide of each of Sample Nos. 3 and 15, the cemented carbide alloy structure of Sample No. 15 was more homogeneous. The powder containing tungsten carbide of each of Sample Nos. 3 and 15 is a powder containing tungsten carbide obtained by the method of Example. It was presumed that, even if the powders have a similar Fsss particle size and crystallite size, the homogeneity of the cemented carbide alloy structure is different due to the difference in the homogeneity of the crystallite size. In general, when the cemented carbide alloy structure is uniform, variation in the transverse rupture strength is reduced. Therefore, when the crystallite size of the powder is more uniform, the properties of the cemented carbide alloy are improved.

It should be understood that the embodiment and examples disclosed herein are illustrative and non-restrictive in all respects. The scope of the present invention is defined by the claims, rather than the embodiments above, and is intended to include any modifications within the meaning and scope equivalent to the claims.

The invention claimed is:

1. A powder containing tungsten carbide, wherein:
the powder has an Fsss particle size of greater than or equal to 0.3 μm and less than or equal to 1.5 μm, and a content rate of the tungsten carbide of greater than or equal to 90% by mass;
the powder has a crystallite size (average particle diameter) Y satisfying a relational expression of $Y \leq 0.1 \times X + 0.20$ (X: the Fsss particle size of the power containing tungsten carbide); and
the powder contains chromium in an amount of greater than or equal to 0.2% by mass and less than or equal to 2.5% by mass.

2. The powder containing tungsten carbide according to claim 1, wherein the powder contains oxygen in an amount of less than or equal to 0.3% by mass.

* * * * *